United States Patent [19]

Rajecki

[11] Patent Number: 5,390,465
[45] Date of Patent: Feb. 21, 1995

[54] PASSTHROUGH DEVICE WITH FIRESTOP

[75] Inventor: James A. Rajecki, Broadview Heights, Ohio

[73] Assignee: The Lamson & Sessions Co., Cleveland, Ohio

[21] Appl. No.: 116,719

[22] Filed: Sep. 3, 1993

Related U.S. Application Data

[63] Continuation-in-part of Ser. No. 029,685, Mar. 11, 1993.

[51] Int. Cl.⁶ ............................................. F16L 5/00
[52] U.S. Cl. ................... 52/741.3; 52/232; 52/741.1; 52/220.8; 285/211
[58] Field of Search ............ 285/211; 52/232, 741.1, 52/741.3, 741.4, 220.8, 220.1

[56] References Cited

U.S. PATENT DOCUMENTS

| | | |
|---|---|---|
| 3,995,102 | 11/1976 | Kohaut . |
| 4,061,334 | 12/1977 | Bradley et al. . |
| 4,109,423 | 8/1978 | Perrain . |
| 4,136,707 | 1/1979 | Gaillot et al. . |
| 4,221,092 | 9/1980 | Johnson . |
| 4,307,546 | 12/1981 | Dolder . |
| 4,364,210 | 12/1982 | Fleming et al. . |
| 4,419,535 | 12/1983 | O'Hara . |
| 4,467,577 | 8/1984 | Licht . |
| 4,529,467 | 7/1985 | Ward et al. . |
| 4,538,389 | 9/1985 | Heinen . |
| 4,559,745 | 12/1985 | Wexler . |
| 4,583,565 | 4/1986 | Cornwall . |
| 4,587,082 | 5/1986 | Schoening et al. ................ 52/220.8 |
| 4,642,956 | 2/1987 | Harbeke . |
| 4,646,486 | 3/1987 | Hauff . |
| 4,669,759 | 6/1987 | Harbeke . |
| 4,724,858 | 2/1988 | Cornwall . |
| 4,748,787 | 6/1988 | Harbeke . |
| 4,796,401 | 1/1989 | Wexler . |
| 4,804,160 | 2/1989 | Harbeke .............................. 52/220.8 |
| 4,823,527 | 4/1989 | Harbeke . |
| 4,848,043 | 7/1989 | Harbeke . |
| 4,850,385 | 7/1989 | Harbeke . |
| 4,877,216 | 10/1989 | Harbeke .............................. 52/220.8 |
| 4,882,886 | 11/1989 | Harbeke . |
| 4,888,925 | 12/1989 | Harbeke . |
| 4,894,966 | 1/1990 | Bailey et al. . |
| 4,901,488 | 2/1990 | Murota et al. . |
| 4,916,800 | 4/1990 | Harbeke .............................. 52/232 |
| 4,918,761 | 4/1990 | Harbeke . |
| 4,951,442 | 8/1990 | Harbeke, Jr. . |
| 4,953,235 | 9/1990 | Cornwall . |
| 5,058,341 | 10/1991 | Harbeke, Jr. . |
| 5,155,957 | 10/1992 | Robertson et al. ................. 52/220.8 |
| 5,309,688 | 5/1994 | Robertson .......................... 52/220.8 |

Primary Examiner—Michael Safavi
Assistant Examiner—Wynn E. Wood
Attorney, Agent, or Firm—Fay, Sharpe, Beall, Fagan, Minnich & McKee

[57] ABSTRACT

A device for installation in a building wall or floor to provide a passthrough opening for pipes, tubing, and the like includes an axially open first end and a second end closed by a transverse wall. A ring of intumescent material fills the axially open first end of the housing, and in one embodiment, a foam plastic filler material substantially fills the housing between the intumescent ring and the transverse wall. The intumescent ring can be provided with a central opening sized to engage with an interference fit a tube or pipe passing through the device. Alternatively, the ring can support a tube coupling for providing a tubular connection within the device to receive and couple pipes on opposite sides of the building wall or floor in which the device is installed.

4 Claims, 6 Drawing Sheets

PASSTHROUGH DEVICE WITH FIRESTOP

This application is a continuation-in-part of U.S. application Ser. No. 08/029,685, filed Mar. 11, 1993 for "Passthrough Device With Firestop".

BACKGROUND OF THE INVENTION

The subject invention is directed toward the art of piping and conduit systems and devices and, more particularly, to a coupling device for forming pipe and conduit passthrough openings in building partitions.

During construction of buildings, it is necessary to provide openings through the building floors and walls to permit running of piping, conduit, and cable systems. Many different types of fitting and coupling devices have been used for this purpose. These devices have varied from simple, removable forms to permanently installed boxes and housings of complex design.

Generally, however, whether of simple or complex design, the currently available devices are often very labor intensive. Their labor intensive nature is particularly evident during the installation of the code required firestop materials after the piping and conduit systems have been installed. Typically, it has been necessary to caulk or trowel intumescent materials about the pipes and conduits where they pass through the partition fitting and coupling devices.

BRIEF STATEMENT OF THE INVENTION

The subject invention provides a coupling device which overcomes the noted problems by having the firestop material incorporated into the device prior to the time the device is installed in the building. Thus, merely installing the coupling device in the original construction provides a passthrough opening with the necessary firestop material already in place. Subsequent caulking or troweling of such materials about the pipe and conduits which are installed therein is not required. Likewise, the installation of separate firestop collars or a similar device is not required.

In accordance with the invention, a coupling device is provided for installation in a building partition to provide a passthrough opening for conduits, pipes, and the like. The device comprises an axially elongated, tubular outer housing having first and second ends with the first end open and the second end preferably closed by a transverse end wall. A laterally extending flange is provided about the exterior of the housing for mounting the housing in an opening extending through the partition. A ring of intumescent firestop material is positioned in the first open end, and a filler material of annular shape extends from the ring of intumescent material to the transverse end wall.

Preferably, the tubular outer housing is formed of plastics material, and the ring of intumescent firestop material has a central opening which is sized to receive a tube to extend through the partition with an interference fit.

In one embodiment, the space between the intumescent firestop material and the transverse end wall is filled with a foam plastic filler material.

In use, the device can be inserted into a preformed opening and mounted therein through the use of the laterally extending flange. Alternatively, the flange can be used to mount the coupling device directly to partition forms or deck panels and the wall or floor poured in place about the device. Thereafter, the closed end of the device can be cut off at the surface level of the floor or wall to allow installation of the tube member which extends through the housing. The interior of the device is, however, enclosed and protected during the construction operations, such as floor pouring, and is not exposed until it is time to install the piping or conduits through the coupling device.

As can be seen from the foregoing, a primary object of the invention is the provision of a self-contained device which can be used to provide passthroughs for any types of pipes, tubular conduits, and cable systems while providing a firestop installation.

Yet another object is the provision of a device of the type described wherein the firestop material is installed and in place at the same time that the device is installed in the building project.

A further object of the invention is the provision of a device of the type described wherein it is not necessary to have workmen return to the construction site after the piping has been installed for the purpose of installing firestop material.

Yet another object of the invention is the provision of a device of the type described which can be formed from plastics materials and readily and simply installed to provide any desired type of conduit and pipe passthrough.

A still further object is the provision of a coupling device of the type described wherein the internal components are protected during much of the building construction period.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED AND ALTERNATE EMBODIMENTS

Figure 1:
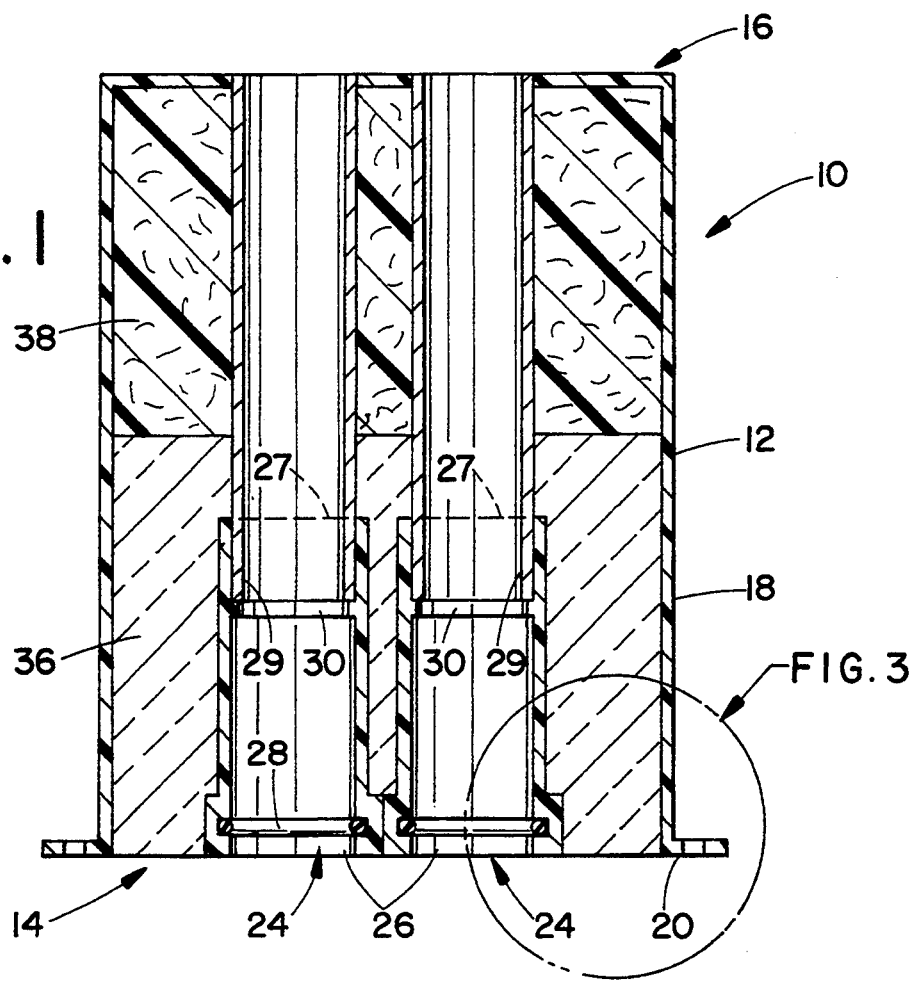
FIG. 1 is a vertical cross-sectional view through a coupling device formed in accordance with a preferred embodiment of the invention.
Figure 2:
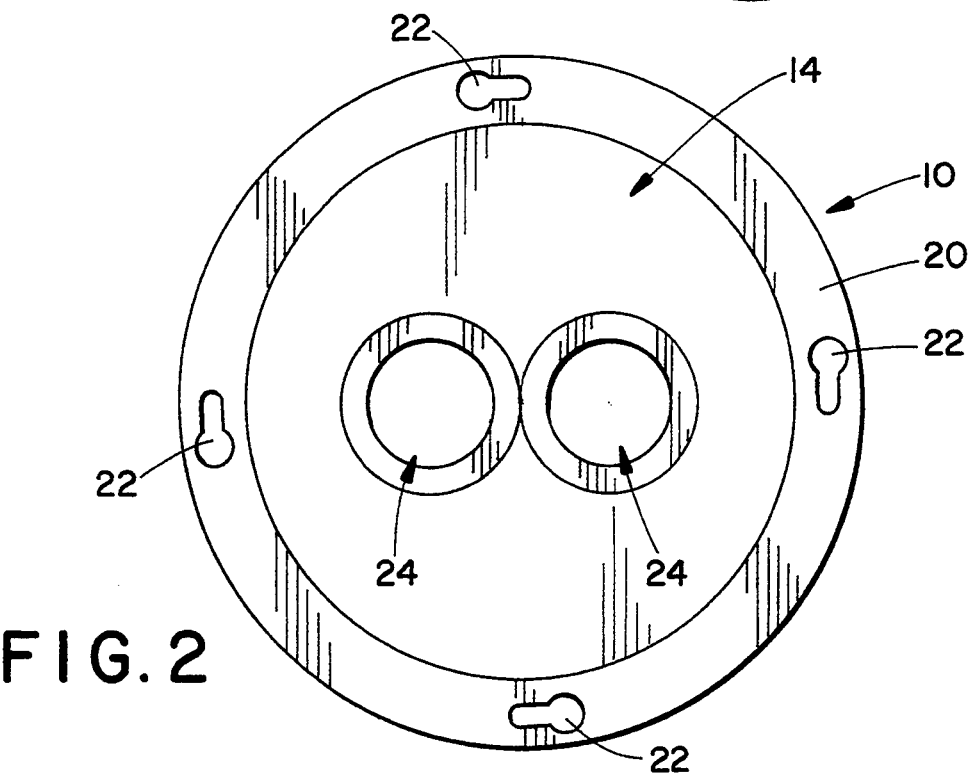
FIG. 2 is a bottom plan view of the device of FIG. 1.
Figure 3:
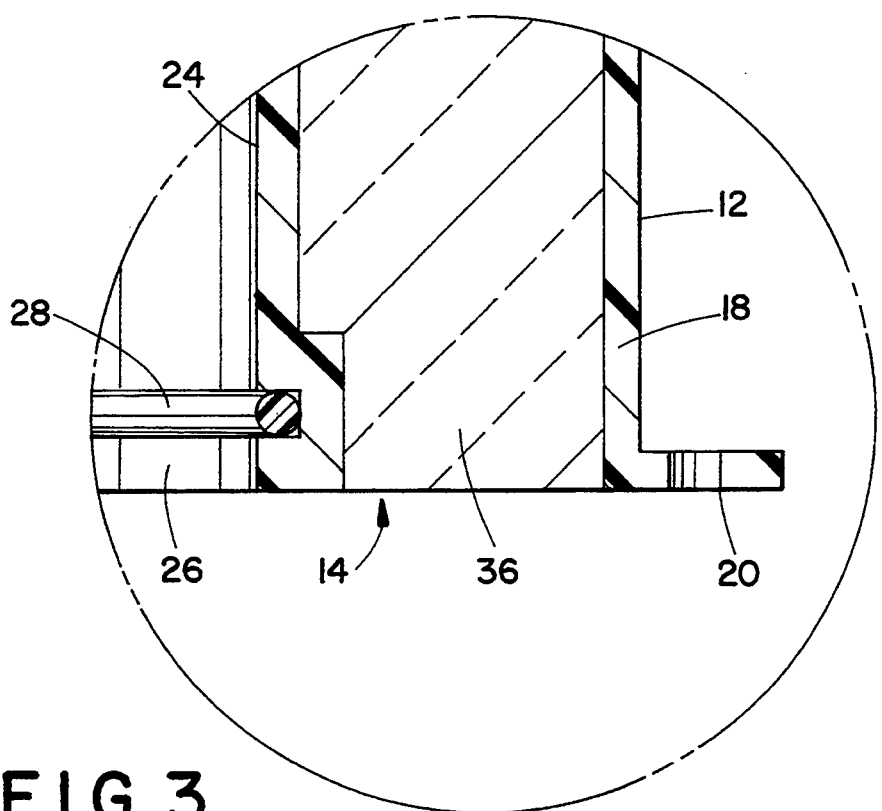
FIG. 3 is a greatly enlarged view of the circled area of FIG. 1.

Referring more particularly to the drawings wherein the showings are for the purpose of illustrating preferred and alternate embodiments of the invention only, and not for the purpose of limiting same, FIGS. 1 through 3 best show the overall arrangement of a preferred coupling device 10 comprising an outer housing 12 of generally tubular shape and having an open lower or first end 14 and a closed upper or second end 16. The housing 12 is preferably formed from a suitable plastics material, such as PVC or any suitable ABS plastic or the like. The side wall 18 of the tubular housing is relatively thin and, in the subject embodiment, has a circular cross section. However, as can be readily understood, the actual cross-sectional shape of the housing is not important and could vary significantly. Positioned about the open first end 14 of the housing 12 is a laterally extending, integral flange 20 which is circumferentially continuous and provides means for mounting the device in a manner subsequently to be described. As best seen in FIG. 2, the mounting flange 20 preferably includes circumferentially-spaced openings 22 which can be provided to facilitate mounting of the assembly through the use of conventional nails, screws, or the like. It should be noted that the openings 22 are shown as having somewhat of a key-hole shape so as to permit selective removal of the device from standard headed fasteners by a slight rotation to align the openings with the head of the fastener.

Upper end wall 6 extends transverse to the longitudinal axis of the coupling device 10 and generally perpendicular to the side wall 18. Additionally, in this embodiment, the end wall 16 is integral with the side wall 18 and is preferably completely closed and imperforate. Under certain conditions, the end wall 16 could be integral or a separate applied element.

Extending axially within housing 12 are a pair of tubular coupling elements 24. Although two couplings are shown, it is clear that any number of such couplings of any particular size or combination of sizes could be provided as desired. In the subject embodiment, each of the couplings 24 are a tubular slip coupling design having an entrance end 26 and an exit end 27. The couplings 24 are positioned with their entrance ends opening to the first, open end 4 of the housing. In the embodiment under consideration, a circumferential seal element in the form of an O-ring 28 is positioned in a suitable groove formed about the entrance end of the coupling 24. The upper or exit end 27 of each coupling 24 is joined with a tube member 29 which extends from the respective coupling element 24 to a position closely adjacent the second end of the housing 12. As can be appreciated, the tubular element 29 can be an integral part of the associated coupling 24 or it can be joined thereto in the manner shown by a slip fit to a locating flange portion 30. The juncture between the coupling 24 and the associated tube 28 can be bonded or sealed in any convenient manner, if desired.

Preferably, the individual tubular pipe coupling elements 24 and the associated tube members 28 are formed from suitable, conventional plastics material such as PVC and have a circular cross section as best seen in FIG. 2.

The coupling elements 24 are surrounded and enclosed by intumescent firestop material which fills the space between the coupling elements and the outer housing 12. Any of many commercially available intumescent firestop compounds could be used at the location shown. Specifically, as can be best seen in FIG. 1, the firestop material 36 extends beyond the inner end of the individual coupling members to a point well up the length of the tube members 29. The firestop material thus locates and positions the coupling members within the outer housing. The space about the upper ends of the tubular members 28 and between the firestop material 36 and the end wall 16 is preferably filled by a filler material 38, such as a foamed plastic or other lightweight solid material. The filler material 38 further locates the tubes 29 and acts to protect the tubes 29 and strengthen the housing 12.

To use the device shown in FIGS. 1 through 3, it is, of course, possible to merely form an opening through a pre-existing wall structure and insert the device therethrough with the radially extending flange 20 engaging the edges of the opening and preventing further movement of the device through the wall opening. The flange can then be nailed or otherwise secured to the area surrounding the opening. On the opposite side of the wall or partition, the closed end of the housing 12 can be cut away to a level corresponding to the surface of the wall with the tubes 28 exposed for connection with associated piping or the like.

Figure 4:
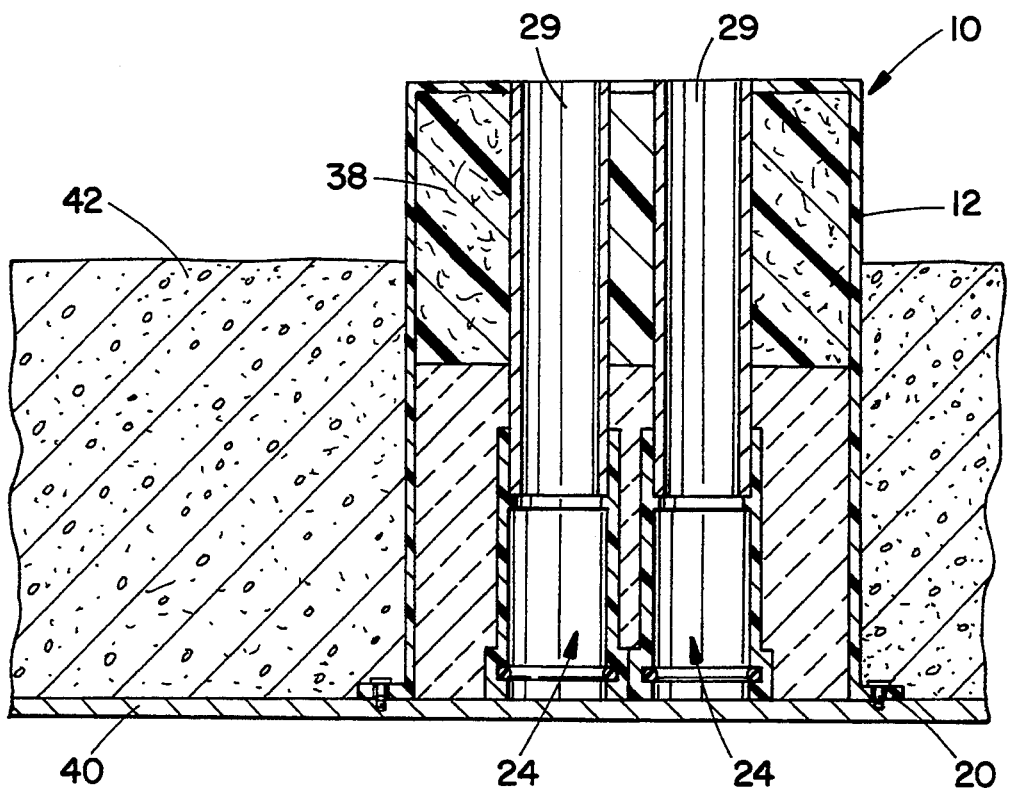
FIG. 4 shows the device of FIG. 1 in place on a building deck form with the concrete floor structure poured in place about the coupling device.
Figure 5:
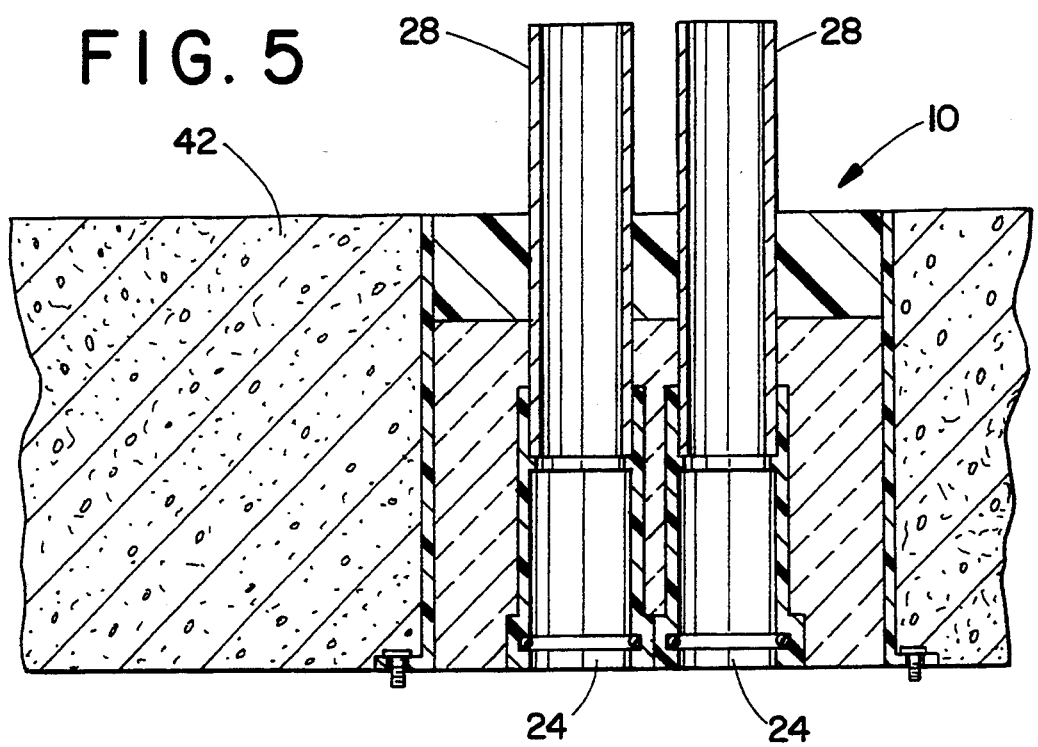
FIG. 5 is a view similar to FIG. 4 but showing the device after the closed end has been removed to provide access to the ends of the interior coupling elements.

Alternatively, as shown in FIGS. 4 and 5, the device can be used during the actual construction of a partition, such as a floor or wall panel. In such an instance, the coupling device 10 is nailed or otherwise connected in a located position on the form or deck 40. Thereafter, the wall or floor concrete 42 is poured into position as shown in FIG. 4. Subsequently, as shown in FIG. 5, the form member 40 is removed and the upper end of the casing 12 and the surrounding filler material is removed leaving the tubes 28 exposed for connection with the associated building piping system. The intumescent firestop material is in position such that should a fire break out, the expansion of the material closes off the opening and thereby prevents smoke or fire from traveling through the partition.

Figure 6:
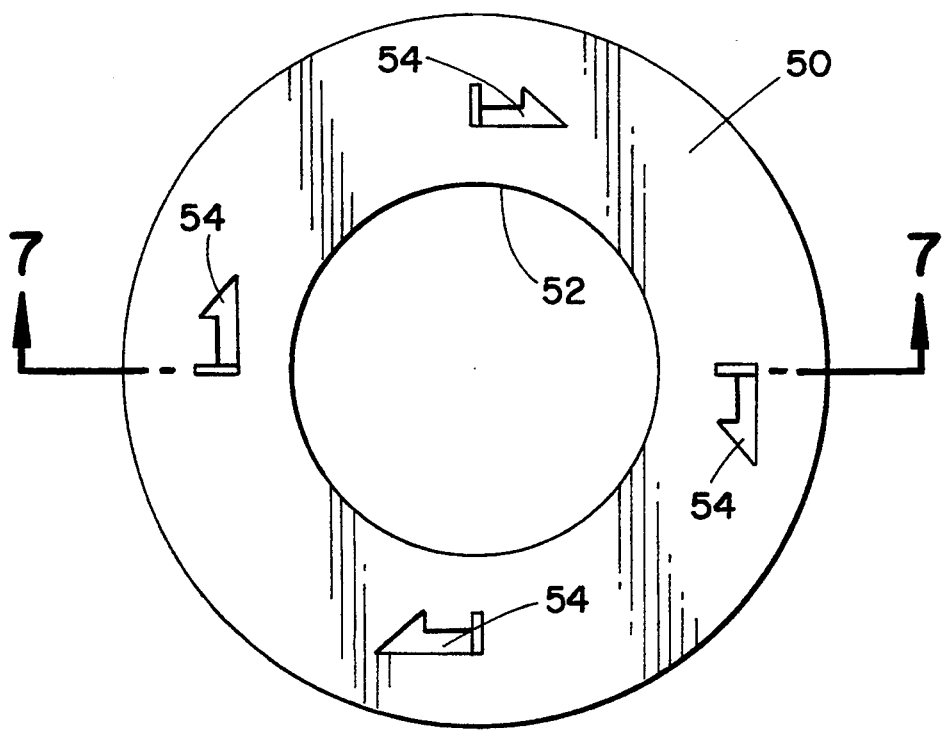
FIG. 6 is a plan view of a metal disk member used in conjunction with the device of FIG. 1.
Figure 7:
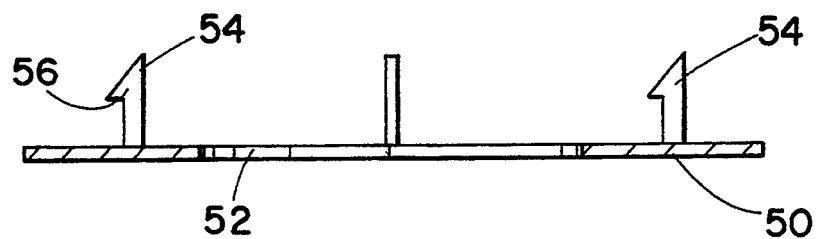
FIG. 7 is a cross-sectional view taken on line 7—7 of FIG. 6.
Figure 8:
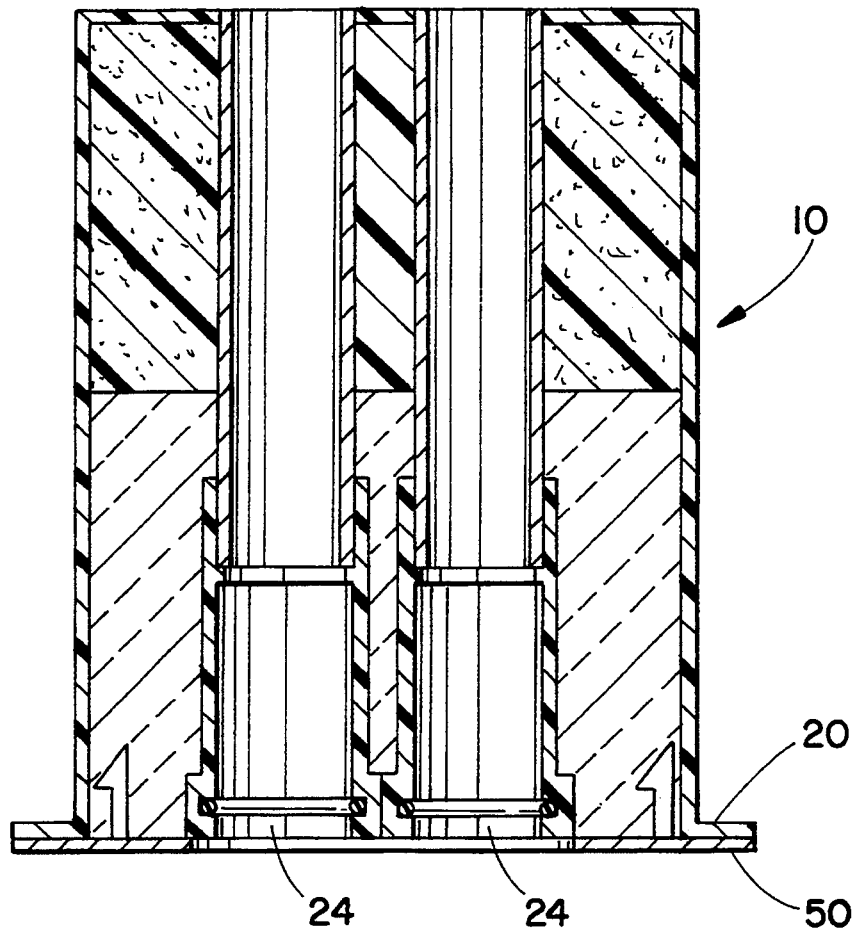
FIG. 8 is a view similar to FIG. 1 but showing the metal disk member of FIGS. 6 and 7 in position on the entrance end of the coupling device.

FIGS. 6 through 8 illustrate a modified form of the invention wherein a metal disk member 50 is arranged for mounting in conjunction with the device 10 to prevent it from being expelled through the opening when impacted by a high pressure water jet which may be used in fighting fires in the building. As shown in FIGS. 6 and 7, the metal disk 50 is of a size such as to have an outer peripheral extent greater than the open end of the housing 12. A center opening 52 is formed through the disk so that it allows free access to the entrance ends of the individual coupling members 24. Referring to FIG. 8, the disk member has a maximum size which is preferably at least as great as the flange 20 on the coupling device 10. Additionally, as shown in FIGS. 6 and 7, the disk 50 is provided with fastening means which allow it to be connected to the coupling device 10. These means could take many forms, but in the subject embodiment, they comprise arrow-shaped stampings which, as shown in FIG. 6, are stamped from the body of the disk and bent to extend upwardly as best seen in FIG. 7. These stampings identified with the numeral 54 have a pointed upper end and a laterally extending tine 56 such that they can be driven into the intumescent firestop material to hold the disk 50 in place overlying the flange 20.

As can be appreciated, the disk 50 can be put into position prior to installation of the device 10 or at some later time after the forms 40 have been removed.

Figure 9:
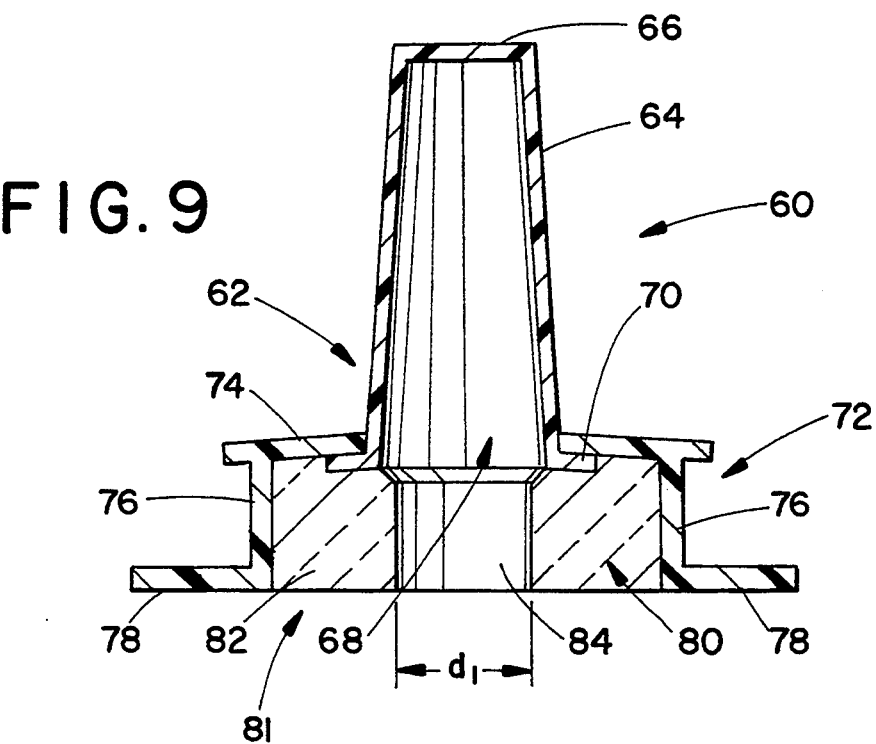
FIG. 9 shows a passthrough device incorporating an intumescent firestop material arranged to engage the through tube with an interference fit.
Figure 10:
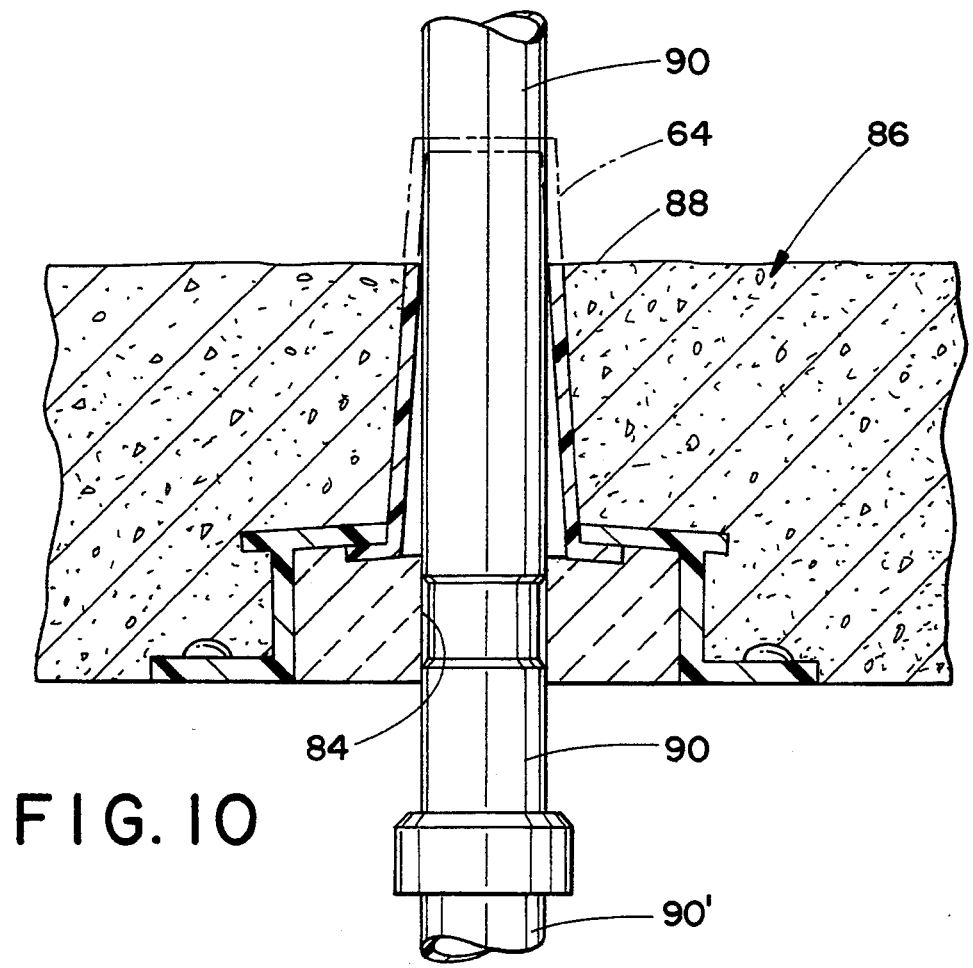
FIG. 10 shows the FIG. 9 type of passthrough device in an installed condition; and, FIG. 11 shows another form of passthrough device.

FIGS. 9 and 10 show a further embodiment of the invention which can be used to provide a firestop passthrough opening in a building partition. As shown therein, the passthrough device 60 includes an axially elongated, tubular outer housing 62 which comprises a first axially-elongated plastic sleeve-like member 64 having a closed end 66 and an open end 68. The open end 68 has a radially extending collar 70 which carries a relatively large diameter flange means 72. Flange means 72 is preferably formed of plastic and includes an upper annular wall 74 which is sized so as to be closely received on the sleeve 64 and rest on the upper surface of the collar 70. The wall 74 can be bonded or mechanically connected to collar 70. A downwardly extending, cylindrical sleeve portion 76 is joined to the annular wall 74 and terminates in a outwardly extending base collar or flange 78. This provides a relatively large diameter, shallow chamber 80.

Positioned within chamber 80 is a rigid ring 81 of intumescent firestop material in the form of an annular body 82 having a central opening 84 extending therethrough. Opening 84 is sized with a diameter d1 that is selected based on the size of the plastic pipe which is to be passed through the assembly after it is installed in a building partition. In particular, the diameter d1 is selected so as to be slightly smaller than the outer diameter of the plastic pipe which the assembly is to receive. Preferably, the diameter d1 is selected so that the plastic pipe can be manually forced through the center opening 84 but such that the ring engages the outer surface of the associated pipe with a tight interference fit. Additionally, it is preferable that the cylindrical wall 64 be only slightly larger than the nominal size of the plastic pipe. Preferably, the ring 82 is affixed or otherwise bonded into the chamber 80.

The particular intumescent material used to form ring 82 can be of any conventional, commercially available material having the necessary rigidity and characteristics to engage about tube 90 and form the required interference fit while permitting the tube to be inserted therethrough.

FIG. 10 shows the device of FIG. 9 in an installed position. As was discussed with the prior embodiments, the assembly would normally be installed during the formation of the building partitions or floors by being attached to the form elements and the floor or wall structure poured in place such as shown at 86 in FIG. 10. After the floor is poured, the upper end section of the tubular body 64 is removed by being cut flush with the upper surface 88 of the floor. This removed section is shown in dotted lines in FIG. 10. When the supporting associated forming materials are removed, the tube 90 can be installed merely by being forced upwardly through the center opening 84. At this time, it will be firmly and positively engaged because of the friction or interference fit with the ring of intumescent material. Thereafter, a second tube section 90 can be joined to tube section 90 in the usual manner.

Figure 11:
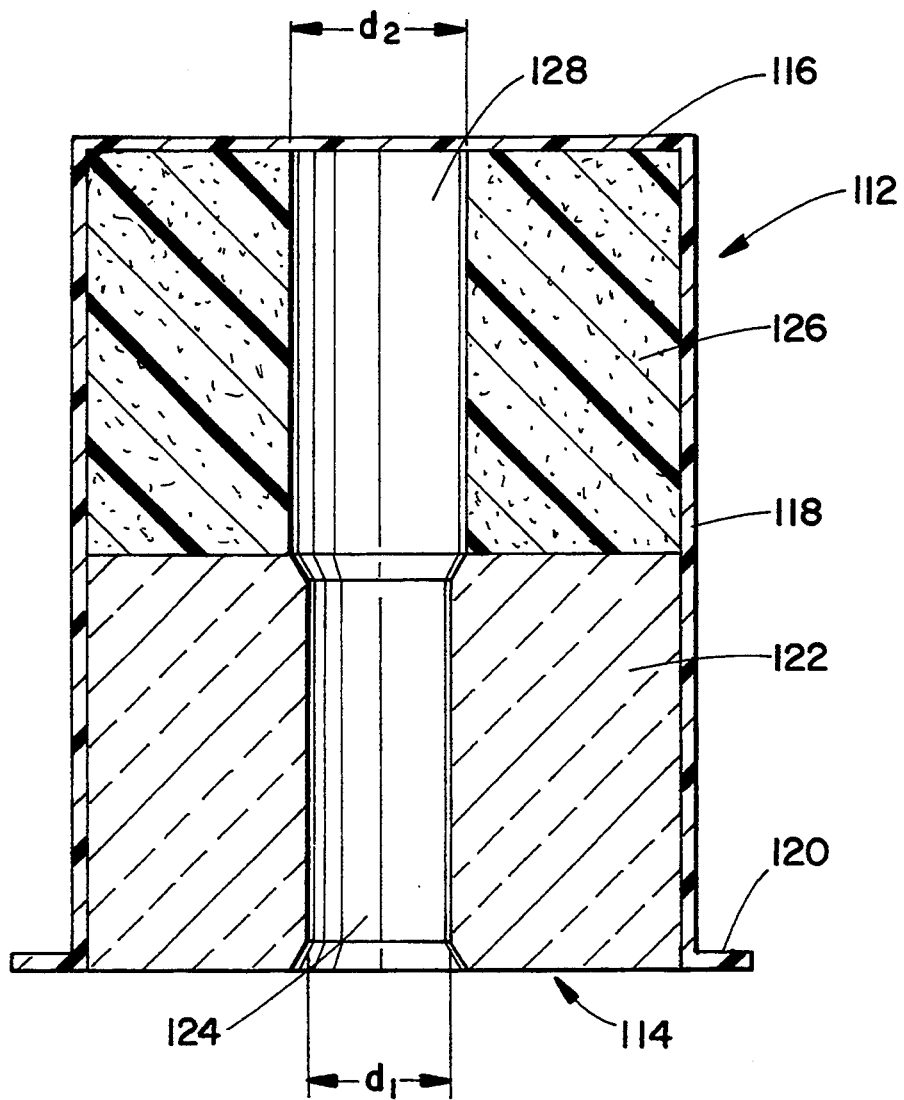

FIG. 11 shows a further embodiment of the invention which is similar in many ways to the previously-discussed FIGS. 1 through 5 embodiment but includes many features from the FIGS. 9 and 10 embodiment. Specifically, the passthrough device of FIG. 11 generally comprises a housing 112 which is a molded plastic tubular member having an open lower or first end 114 and a closed upper end 116. The side wall 118 has a generally circular cross section and terminates at its lower end in a laterally-extending integral flange 120 which provides a mounting arrangement for putting the device in position on a form or the like in the manner previously discussed with reference to the FIGS. 1 through 5 embodiment.

Positioned in the open lower end of the housing 112 is a rigid ring of intumescent firestop material 122 which has a center opening 124. In the embodiment under consideration, the ring of firestop material 122 extends upwardly into the housing 112 and has a volume such that it can perform the firestop function previously discussed. The central opening 124 is sized in the manner discussed with reference to the center opening 84 of the FIGS. 9 and 10 embodiment. That is, the opening 124 has a diameter d1 which is slightly smaller than the outer diameter of the plastic pipe or tube which is to be installed through the passthrough device when it is placed in use. The diameter is such as to create an interference fit with the installed pipe or tubing. Located above the ring 122 of firestop material is a section of filler material which substantially fills the end of the housing 112 in the area above the firestop. In the subject embodiment, this filler material comprises an annular block of foam plastic 126 which has a center opening 128 extending therethrough. The opening 128 has a diameter d2 which is preferably slightly larger than the nominal diameter of the pipe which is to be installed through the assembly. This arrangement allows the pipe to be readily installed even when the filler 126 remains in place.

To use the device of FIG. 11, it is positioned in the desired location on the associated forms in the manner described with reference to FIG. 4. After the floor or wall structure has been formed and the forms removed, the closed upper end of the assembly can be cut off as desired relative to the floor structure, and the necessary tube or pipe installed through the opening 124, 128.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A method of installing a plastic pipe of diameter d to extend through a building partition comprising:
   a) providing a tubular sleeve member having a first section of internal diameter d1 which is greater than d, one end of the first section being closed and the other end having a radially outwardly extending cylindrical open ended flanged collar of a diameter d2 substantially greater than d joined axially thereto;
   b) filling the collar with a solid intumescent material to form a solid ring of intumescent material axially aligned with the tubular sleeve, the center of the ring having a circular opening therethrough of a diameter only slightly less than d;
   c) mounting the tubular sleeve member to extend through the building partition; and,
   d) cutting off the closed end of the tubular sleeve and installing a plastic pipe of diameter d through the tubular sleeve by forcing the pipe axially through the center circular opening of the ring of intumescent material in interference fit relationship therewith.

2. The method as set forth in claim 1 wherein the tubular sleeve member is formed of plastic and is positioned to extend through the building partition during the original construction of the building.

3. The method as set forth in claim 1 wherein the ring of intumescent material has an outer diameter substantial equal to d2.

4. A method of forming a firestop passthrough opening for a pipe of diameter d through a building partition comprising:
   a) providing a tubular sleeve member having a first section of internal diameter d1 which is greater than d, one end of the sleeve being closed and the other end having a radially outwardly extending cylindrical open ended flanged collar of a diameter d2 substantially greater than d1 joined axially thereto;
   b) filling the collar with a solid intumescent material bonded therein to form a solid ring of intumescent material axially aligned with the tubular sleeve, the center of the ring having a circular opening therethrough of a diameter slightly less than d;
   c) mounting the tubular sleeve to extend through the building partition with the closed end of the sleeve spaced outwardly from the partition and the collar located within the partition and closely enclosed about its outer surface; and,
   d) cutting off the closed end of the tubular sleeve and inserting a plastic pipe of diameter d through the center circular opening of the ring of intumescent material in interference fit therewith.

* * * * *